(12) United States Patent
Dünnenberger et al.

(10) Patent No.: US 9,700,840 B2
(45) Date of Patent: Jul. 11, 2017

(54) METHOD FOR REMOVING AN ESTER FROM A VAPOR MIXTURE

(71) Applicant: Sulzer Chemtech AG, Winterthur (CH)

(72) Inventors: Daniel Dünnenberger, Winterthur (CH); François Loviat, Sennhof (CH)

(73) Assignee: Sulzer Chemtech AG, Winterthur (CH)

( * ) Notice: Subject to any disclaimer, the term of this patent is extended or adjusted under 35 U.S.C. 154(b) by 40 days.

(21) Appl. No.: 14/415,784

(22) PCT Filed: Apr. 23, 2013

(86) PCT No.: PCT/EP2013/058394
§ 371 (c)(1),
(2) Date: Jan. 20, 2015

(87) PCT Pub. No.: WO2014/015999
PCT Pub. Date: Jan. 30, 2014

(65) Prior Publication Data
US 2015/0151247 A1    Jun. 4, 2015

(30) Foreign Application Priority Data
Jul. 24, 2012    (EP) .................................. 12177650

(51) Int. Cl.
*B01D 53/14*    (2006.01)
*B01D 53/86*    (2006.01)
*B01D 53/96*    (2006.01)

(52) U.S. Cl.
CPC ..... *B01D 53/8668* (2013.01); *B01D 53/1425* (2013.01); *B01D 53/1493* (2013.01);
(Continued)

(58) Field of Classification Search
None
See application file for complete search history.

(56) References Cited

U.S. PATENT DOCUMENTS 4,708,721 A    11/1987    Ehrler
5,266,706 A    11/1993    Bhatia
(Continued)

FOREIGN PATENT DOCUMENTS

DE          4040334 A1      6/1992
DE    102011017032 A1 *   10/2012    ............. B01D 53/56
(Continued)

OTHER PUBLICATIONS

DE 102011017032 A1 English Translation, Oct. 2012, Zander et al.*

*Primary Examiner* — Anita Nassiri Motlagh
(74) *Attorney, Agent, or Firm* — Larson & Anderson, LLC (57) ABSTRACT

A method for the removal of an ester (3') from a vapor mixture (5') containing the ester (3') is disclosed. The method comprises the steps of by bringing the vapor (5) mixture (5') into contact with an aqueous solution (6') containing the acid (4') corresponding to the ester (3'), wherein a portion of the ester (3') is dissolved in or otherwise transferred to the aqueous solution (6'), and the aqueous solution (6') is after the contact led in a circulation (73), the aqueous solution (6') is processed in the circulation (73) in a process comprising: a heating step (240), a (10) reaction step (250) having a residence time and a temperature, a cooling step (260), wherein the heating step (240) precedes the reaction step (250), the reaction step (250) precedes the cooling step (260), and the residence time and the temperature in the reaction step (250) are sufficient to substantially reduce the content of the ester (3') in the aqueous solution (6'). The invention further (15) relates to an apparatus (1) for carrying out said process. The present invention further relates also to the use of the apparatus (1) in the method of
(Continued)

the invention, preferably in the production of a lactide (13') or a polylactic acid polymer (12').

20 Claims, 7 Drawing Sheets (52) U.S. Cl.
CPC ...... *B01D 53/96* (2013.01); *B01D 2255/2022* (2013.01); *B01D 2255/2027* (2013.01); *B01D 2255/2045* (2013.01)

(56) References Cited

U.S. PATENT DOCUMENTS

| | | | |
|---|---|---|---|
| 8,940,262 B2* | 1/2015 | Schodel | B01D 53/56 422/168 |
| 2006/0276619 A1 | 12/2006 | Heckmann et al. | |
| 2010/0252076 A1* | 10/2010 | Hagen | B01D 53/1487 134/31 |

FOREIGN PATENT DOCUMENTS

| | | |
|---|---|---|
| EP | 2 271 696 B1 | 3/2012 |
| JP | 10-17653 A | 1/1998 |
| WO | 2010/012770 A1 | 2/2010 |

* cited by examiner

METHOD FOR REMOVING AN ESTER FROM A VAPOR MIXTURE

BACKGROUND OF THE INVENTION

The present invention relates to a method for the removal of an ester from a vapor mixture. The present invention also relates to an apparatus for carrying out this method, and the use of said apparatus in said method, as well as use of the method or apparatus in the production of a lactide or a polylactic acid polymer.

Removing an ester from a vapor mixture is of utility in the treatment of vapors resulting from vacuum 'overhead' systems used to remove volatile low molecular weight species ('lows') in polycondensation or ring-opening polymerization processes, such as in the production of polyesters prepolymers and resins. For example, the removal of cyclic diesters of an alpha-hydroxycarboxylic acid such as a lactide finds utility in the production of lactide and its polymers.

One method of production of lactide is by means of prepolymerization from lactic acid and subsequent thermal catalytic depolymerization at low pressures. In the production of lactide, byproduct streams containing vapor mixtures of lactide are often produced, and it is desirable to scrub the byproduct streams to reduce their content of volatile organic compounds and/or to recover the lactide as lactic acid for recycling back into the process. For example, the vapor mixture containing lactide may originate from the vacuum overhead system of the reactor system or from distillates in the purification by distillation of the crude lactide product stream obtained in the process. This crude lactide product stream is typically a complex multicomponent mixture containing lactide, water, lactic acid and oligomers.

Vapor mixtures containing lactide are also a common byproduct stream in the production of polylactic acid (PLA) polymers, as in the ring-opening polymerization of lactide. For example, it is desirable to remove residual lactide monomer and other 'lows' from the PLA in order improve the product polymer properties such as its melt, molecular weight and color stability and/or mechanical properties.

Residual lactide and other 'lows' may be removed from the PLA by conventional devolatilization methods such as those based on applying low pressure and/or inert gas flow together with temperatures sufficiently high to cause the removal of lactide and other lows from the PLA by distillation. Equipment appropriate for the devolatilization of PLA includes flash evaporators, falling strand devolatizers, thin film evaporators, high volume melt kneaders, and vented single-screw and twin-screw extruders. Vapor mixtures containing lactide may originate from any of these types of equipment and their devolatization processes. The devolatilization process may be integrated into the production of the PLA by having an in-line devolatilzation system after the final reactor in the polymerization and/or the devolatilization may be done in a post-polymerization process. As in the case of the production of lactide, it is often desirable to reduce the content of volatile organic compounds prior to discharge of the byproduct streams and/or to recover the lactide and volatile oligomers for recycling as raw materials into the process to produce lactide monomer and/or to produce PLA.

Processes for the removal of lactide from vapor streams are known. For example EP2030667, which is hereby incorporated by reference, discloses a method and a device for the condensation and washing of process vapors occurring during the production of polylactide. It is disclosed that process vapors containing lactide may be condensed and/or washed by bringing them into contact with a stream of a condensation and washing liquid containing an aqueous solution of lactic acid such that the lactide dissolves in the liquid. It is disclosed that it is preferred to conduct the condensation and washing liquid in a circulation, particularly in the case of a continuous plant for the production of polylactide.

However in the method of EP2030667, the lactide-containing vapors which are condensed lead to an increase in the concentration of the lactide in the condensation and washing liquid. As a result, the solubility limit of lactide is exceeded, and solids precipitate in the circulation liquid causing blockages in the circulation, particularly in the packed bed or in the mass transfer element of the condensation and/or washing column. In addition, the lactide reacts with the water contained in the liquid by ring-opening to form lactoyllactic acid. As a result of the lactoyllactic acid formation, the viscosity of the liquid increases and the distribution over the bed or packing is hindered, and the condensation and washing effect is reduced. EP2030667 thus discloses that it is necessary to supply a mixture of water and lactic acid continuously or in portions to the circulated condensation and washing liquid so that the solubility limit of the lactide in the circulation is not reached and the viscosity of the liquid mixture does not rise. In order to avoiding flooding of the system, it is then necessary to extract a partial flow of the liquid from the circuit, which corresponds to the sum of the rate of flow of the mixture of water and lactic acid and the rate of flow of the condensate into the circuit. Therefore this method requires complex and cumbersome methods in order to avoid blockages and to maintain the proper balance of flows.

A further disadvantage of the method of EP2030667 is that lactide has very poor solubility in water, lactic acid and their mixtures, and lactide also has a relatively slow rate of dissolution and hydrolysis in these liquids. Therefore large amounts of water and lactic acid must be added to avoid precipitation. Adding large amounts of these liquids is counterproductive in that the function of the condensation and washing method and apparatus should be to remove components coming from the process, such as those originating from the vapor mixture, and not to add further components to the process.

Slow rates of dissolution and hydrolysis may be overcome by increasing the temperature of the condensation and washing liquid in EP2030667. However increasing the temperature simultaneously increases then the vapor pressure of the liquid in the column. The column though is in fluid communication with the devolatilization vessel, which is the source of the vapor mixture containing lactide. Therefore increasing the temperature and thus pressure in the column will also increase the pressure in the devolatilization vessel and thus negatively impact the removal of lactide and other lows by distillation in that vessel.

Alternatively, the saponification of esters by bases is known, and a caustic solution such as a NaOH solution may be added to the column in order to catalyze the hydrolysis of the ester and convert it to its sodium salt. However, this method requires the controlled addition of additional substances to the process in their necessary amounts, and the use of caustic solutions is generally undesirable due to the corrosion and EHS problems associated with their use. Furthermore considerable heat is generated when caustic is mixed with water, and this may lead to uncontrolled and violent boiling and/or splattering in the process if the caustic solution becomes concentrated in one area, or if it is added too rapidly or to aqueous solution that is too cold or too hot.

In conclusion, it would be desirable to have a method and apparatus for removing esters such as lactides from vapor mixtures that would be easier to control than that of EP2030667, and that is able to prevent the precipitation of solids and increases in viscosity in the system without the need for adding large amounts of additional components or caustic solutions to the circulation and while allowing a low liquid temperature and thus pressure to be maintained in the column.

SUMMARY OF THE INVENTION

Starting from this state of the art, it is an object of the invention to provide a method for the removal of an ester from a vapor mixture that does not suffer from the previous mentioned deficiencies, particularly the need for feeding liquid solvents or caustic solutions or the use of elevated temperatures and thus pressures in a column in order to prevent precipitation and blockages. Further objects of the invention include providing an apparatus suitable for use in said process, the use of said apparatus in said process, and the use of said process and apparatus in the production of a lactide or a polylactic acid polymer.

According to the invention, these objects are achieved by a method for the removal of an ester from a vapor mixture containing the ester, said method comprising the steps of bringing the vapor mixture into contact with an aqueous solution containing the acid corresponding to the ester, wherein a portion of the ester is dissolved in or otherwise transferred to the aqueous solution, the aqueous solution is after the contact led in a circulation, and the aqueous solution is processed in the circulation in a process comprising: a heating step, a reaction step having a residence time and a temperature, and a cooling step, wherein the heating step precedes the reaction step, the reaction step precedes the cooling step, and the residence time and the temperature in the reaction step are sufficient to substantially reduce the content of the ester in the aqueous solution.

Because esters such as lactide are hydrolytically quite unstable, for a portion of the ester to dissolve in the aqueous solution means that at least some of the ester and/or its hydrolysis products dissolve in the aqueous solution. Upon dissolution, the ester may hydrolyze to give its hydrolysis products as the dissolved species. In the case of lactide as ester, the hydrolysis products include lactoyllactic acid and lactic acid. For a portion of the ester to otherwise transfer to the aqueous solution means that a part of the ester may transfer to the aqueous solution by another means than dissolution, for example, the ester may solidify from the vapor and/or liquid phase and transfer to the aqueous solution as a precipitate or suspended solid. The precipitate or suspended solid may subsequently then likewise hydrolyze and/or dissolve in the aqueous solution in any order, or it may remain as a precipitate or suspended solid.

To substantially reduce the content of the ester means to reduce the content sufficiently such that precipitation of the ester and resultant blockage of the circulation is avoided. The process may readily be monitored for blockage in the circulation by monitoring the flow rate and/or pressure in the circulation. For example, if the flow rate is observed to decrease, the temperature in the reaction step may be increased to reduce the content of the ester in the aqueous solution in the circulation.

According to the invention, these further objects are achieved firstly by an apparatus comprising: a countercurrent column for contacting a vapor mixture with an aqueous solution and a circuit in fluid communication with the column and for circulating the aqueous solution, wherein the countercurrent column has a first inlet for the vapor mixture and a second inlet for the aqueous solution and an outlet for the aqueous solution, wherein the circuit has an inlet and an outlet for the aqueous solution, and wherein the inlet of the circuit is in fluid communication with the outlet of the column, and wherein the outlet of the circuit is in fluid communication with the second inlet of the column, wherein the circuit comprises a first heat exchanger for carrying out a heating step having an inlet and an outlet, a reactor for a reaction step having an inlet and an outlet, and a second heat exchanger for carrying out a cooling step having an inlet and an outlet, wherein the inlet of the first heat exchanger is in fluid communication with the inlet of the circuit, the outlet of the first heat exchanger is in fluid communication with the inlet of the reactor, the outlet of the reactor is in fluid communication with the inlet of the second heat exchanger, and the outlet of the second heat exchanger is in fluid communication with the outlet of the circuit. Said apparatus is used in accordance with the invention in the method of removing an ester from a vapor mixture, preferably in the production of a lactide or a polylactic acid polymer.

The present invention achieves these objects and provides a solution to this problem by means of processing the aqueous solution in the circulation in a process comprising a heating step, a reaction step having a residence time and a temperature, and a cooling step, wherein the heating step precedes the reaction step, the reaction step precedes the cooling step, and the residence time and the temperature in the reaction step are sufficient to substantially reduce the content of the ester in the aqueous solution. As a result, a faster dissolution and more complete hydrolysis of the ester will occur. For example, a lactide may be hydrolyzed all the way to lactic acid without appreciable lactoyllactic acid intermediate remaining. Therefore the problems of precipitation and/or viscosity increases in the circulation will be avoided. The attainment of this desired dissolution and hydrolysis of the ester by the method of the present invention is then readily and robustly achieved.

These results are then surprisingly achieved without the need for adding additional liquids such as water and/or lactic acid to the circulation. This is quite surprising in that EP2030667 discloses that the addition of these liquids are essential aspects of avoiding precipitation and viscosity increases in its claimed invention.

Furthermore these results are surprisingly also achieved without the need to increase the temperature and thus vapor pressure in the countercurrent column or to add additional liquid or catalyst components to the process. In the apparatus of the invention, the use of the first heat exchanger to heat the aqueous solution in the circuit prior to its entering the reactor and the use of the second heat exchanger to cool the aqueous solution after the reaction step allows the reaction to proceed rapidly at elevated temperature without requiring an elevated temperature in the column.

In a preferred embodiment, the ester in the method is a cyclic diester of an alpha-hydroxycarboxylic acid of the formula I, formula I wherein R is selected from the group consisting of hydrogen or linear or branched aliphatic radicals having 1 to 6 carbon atoms, and wherein the acid is an alpha-hydroxycarboxylic acid of the formula II corresponding to the diester of the formula I, formula II Cyclic esters of formula I typically suffer from very low solubility in water and its solutions, as well as low rates of dissolution in water and aqueous solutions. Therefore the method and apparatus of the invention are particularly useful in removing such esters from their vapor mixtures.

According to another preferred embodiment, the vapor mixture in the method is obtained from the devolatization of a polylactic acid polymer prepared by a ring opening polymerization of a lactide. Vapor mixtures containing lactide such as these benefit greatly from the method and apparatus of the invention due to the low solubility and low rates of dissolution of lactide in aqueous solutions of lactic acid at ambient temperatures.

According to another preferred embodiment, the vapor mixture in the method is passed through a steam ejector prior to contacting the aqueous solution. Likewise in a preferred embodiment of the apparatus, the apparatus additionally comprises a steam ejector for passing the vapor mixture through prior to contacting the aqueous solution, wherein the ejector has an inlet and an outlet, and the outlet of the steam ejector is in fluid communication with the first inlet of the countercurrent column. A steam ejector has the advantage of being an inexpensive and simple means to pump large volumes of gas, such as those originating from vacuum 'overhead' systems of reactors and/or devolitilization vessels.

According to another preferred embodiment of the method, a portion of the heating step and a portion of the cooling step take place in a recuperator. Likewise in another preferred embodiment of the apparatus, the apparatus additionally comprises a recuperator for carrying out a further heating step and a further cooling step in the circuit. The use of a recuperator is advantageous in providing an effective means of reducing the total energy consumption by recycling the heat liberated in the cooling step for the heating step in the method.

In yet another preferred embodiment of the method, the content of the ester of in the aqueous solution is reduced in the reaction step to less than 10 wt %, preferably less than 5 wt %, more preferably less than 3 wt %. The content of the ester means the content of the ester present in its dissolved unhydrolyzed form and/or in the form of a solid such as a precipitate or suspended solid. Reduction of the content of the ester to such levels is beneficial in ensuring that problems with precipitation, blockage and increased viscosity in the circulation do not occur.

In still another preferred embodiment of the method, the residence time in the reaction step is at least 0.10 min, preferably 1, more preferably 5, most preferably at least 10, and the temperature in the reaction step is at least 10° C., preferably 20, more preferably 40, most preferably at least 60. In still yet another preferred embodiment of the method, the residence time in the reaction step is from 0.10 to 30 min and the temperature in the reaction step is from 10 to 95° C.,
preferably the time from 0.5 to 25 and the temperature from 20 to 90, more preferably the time from 0.75 to 20 and the temperature from 40 to 80, most preferably the time from 1 to 15 and the temperature from 50 to 75. The use of such temperatures and residence times in the reaction step is beneficial in ensuring that the content of the ester in the aqueous solution is sufficiently reduced so that the problems of precipitation, blockage, and increased viscosity do not occur in the circulation.

In a further preferred embodiment of the method, the reaction step takes place in the presence of an added catalyst. The use of a catalyst increases the rate of hydrolysis reactions and/or derivitization reactions and thus also the rate of reduction of the content of the ester in the aqueous solution. This increase in the rates allows the reaction step to occur more rapidly and at lower temperature, thus increasing the productivity and mildness of the method while reducing the energy consumption and required reactor size of the apparatus.

In a yet further preferred embodiment of the method, the contacting of the vapor mixture with the aqueous solution takes place under at least a partial vacuum, preferably a vacuum of less that 100 mbar, more preferably less than 50 mbar, and most preferably less than 30 mbar. Likewise in another preferred embodiment of the apparatus, the apparatus additionally comprises a vacuum system in fluid communication with the countercurrent column. In many applications the countercurrent column will be in fluid communication with a devolatilization vessel and/or vacuum overhead system. Therefore maintaining a vacuum in the column is beneficially in readily maintaining a high vacuum in the devolatilization vessel to favor distillation of lactide and other lows and/or to maintain a high vacuum in the vacuum overhead system.

In a further preferred embodiment of the apparatus, the circuit additionally comprises a pump for providing a driving force for circulating the aqueous solution.

Another aspect of the invention concerns the use of the apparatus of the invention in the method of the invention, preferably in the production of a lactide or a polylactic acid polymer. Such use benefits then from the previously discussed advantages of the apparatus and the method of the invention. In a preferred embodiment, the use of the apparatus and/or method is in the production of a lactide or a polylactic acid polymer.

One skilled in the art will understand that the combination of the subject matters of the various claims and embodiments of the invention is possible without limitation in the invention to the extent that such combinations are technically feasible. In this combination, the subject matter of any one claim may be combined with the subject matter of one or more of the other claims. In this combination of subject matters, the subject matter of any one method claim may be combined with the subject matter of one or more other method claims or the subject matter of one or more apparatus claims or the subject matter of a mixture of one or more method claims and apparatus claims. By analogy, the subject matter of any one apparatus claim may be combined with the subject matter of one or more other apparatus claims or the subject matter of one or more method claims or the subject matter of a mixture of one or more method claims and apparatus claims. By way of example, the subject matter of claim 1 may be combined with the subject matter of any one of claims 11 to 15. In one embodiment, the subject matter of claim 11 is combined with the subject matter of any one of claims 1 to 10. In one specific embodiment, the subject matter of claim 11 is combined with the subject matter of claim 2. In another specific embodiment, the subject matter of claim 1 is combined with the subject matter of claim 13. By way of another example, the subject matter of claim 1 may also be combined with the subject matter of any two of claims 2 to 15. In one specific embodiment, the subject matter of claim 1 is combined with the subject matter of claims 2 and 11. In another specific embodiment, the subject matter of claim 11 is combined with the subject matters of claims 1 and 2. By way of example, the subject matter of claim 1 may be combined with the subject matter of any three of claims 2 to 15. In one specific embodiment, the subject matter of claim 1 is combined with the subject matters of claims 2, 9 and 11. In another specific embodiment, the subject matter of claim 11 is combined with the subject matters of claims 2, 6, and 9. In yet another specific embodiment, the subject matter of claim 1 is combined with the subject matters of claims 2, 6, and 11. By way of example, the subject matter of any one claim may be combined with the subject matters of any number of the other claims without limitation to the extent that such combinations are technically feasible.

In an analogous manner, the subject matter of one of the above-mentioned embodiments may be combined with the subject matter of one or more of the other above-mentioned embodiments without limitation. By way of example, according to a particularly preferred embodiment of the method, the ester is an ester of formula I and the acid is of formula II and the vapor mixture is obtained from the devolatization of a polylactic acid polymer prepared by a ring opening polymerization of a lactide. By way of another example, according to another particularly preferred embodiment, the vapor mixture is passed through a steam ejector prior to contacting the aqueous solution and a portion of the heating step and a portion of the cooling step take place in a recuperator in the method. By way of yet another example, according to another particularly preferred embodiment, the apparatus additionally comprises a recuperator, a steam ejector, and a vacuum overhead system.

BRIEF DESCRIPTION OF THE DRAWINGS

The invention will be explained in more detail hereinafter with reference to various embodiments of the invention as well as to the drawings. A single quotation mark (') after a reference number is used to indicate those features of the prior art. The schematic drawings show.

DETAILED DESCRIPTION OF THE INVENTION

Figure 1:
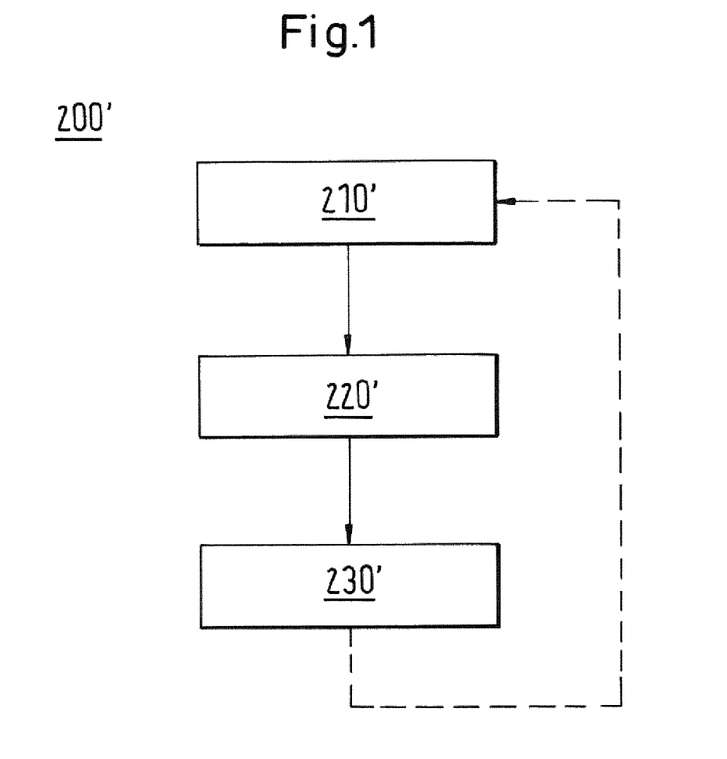
FIG. 1 shows a schematic view of a method according to the prior art.
Figure 2:
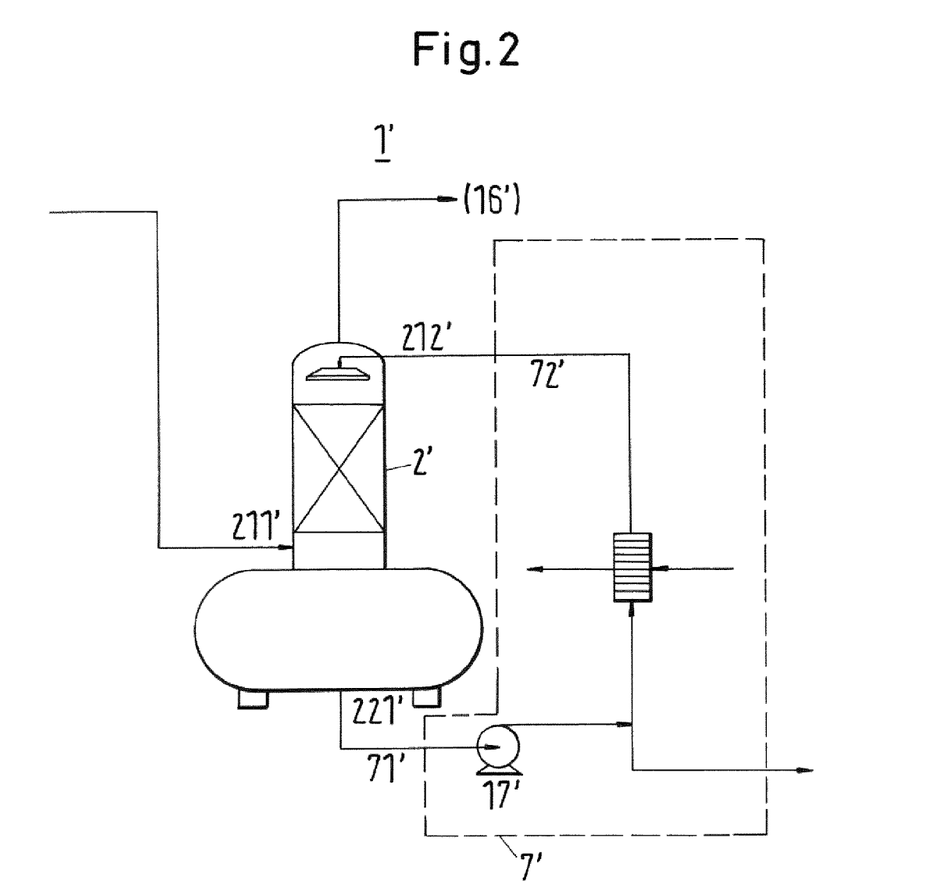
FIG. 2 shows a schematic view of an apparatus according to the prior art and known for use in the prior art method shown in FIG. 1.

FIGS. 1 to 2 show the method and apparatus of the prior art for the removal of an ester from a vapor mixture according to EP2030667. FIG. 1 shows a schematic view of a method of the prior art which as a whole is labeled with reference number 200'. The method has the steps of bringing a vapor mixture 5' containing an ester 3' into contact with an aqueous solution 6' containing an acid 4' corresponding to the ester 3', which is labeled as 210'; dissolving a portion of the ester 3' in the aqueous solution 6', which is labeled as 220', and the aqueous solution 6' is after the contact led in a circulation 73', which is labeled as 230'.

FIG. 2 shows a schematic view of an apparatus of the prior art which as a whole is labeled with reference number 1'. The apparatus 1' has a countercurrent column 2' having a first inlet 211' for a vapor mixture 5', a second inlet 212' for an aqueous solution 6', and an outlet 221' for the aqueous solution 6'. The apparatus 1' additionally has a circuit 7' in fluid communication with the column 2' and for circulating the aqueous solution 6' and having an inlet 71' and an outlet 72' for the aqueous solution 6', wherein the inlet 71' is in fluid communication with the outlet 221' and the outlet 72' is in fluid communication with the second inlet 212'.

Figure 3:
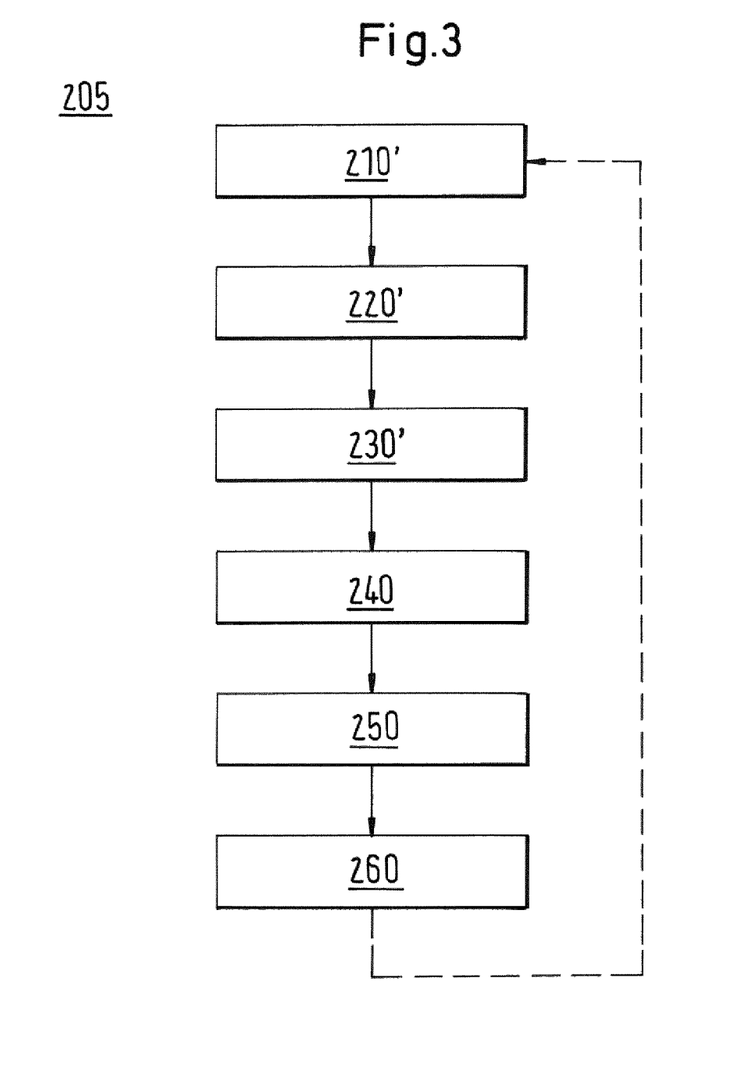
FIG. 3 shows a schematic view of an embodiment of a method according to the invention.

FIG. 3 shows an embodiment of the method according to the invention, which as a whole is labeled with reference number 205. Similar to the prior art method 200' of FIG. 1, the method of the invention 205 comprises the steps of bringing a vapor mixture 5' containing an ester 3' into contact with an aqueous solution 6' containing an acid 4' corresponding to the ester 3', which is labeled as 210'; dissolving or otherwise transferring a portion of the ester 3' in the aqueous solution 6', which is labeled as 220', and the aqueous solution 6' is after the contact led in a circulation 73, which is labeled as 230'. In contrast to the prior art, the aqueous solution 6' is processed in a circulation 73 in the method according to the invention 205 in a process comprising: a heating step 240, a reaction step 250 having a residence time and a temperature, and a cooling step 260, wherein the heating step 240 precedes the reaction step 250, the reaction step 250 precedes the cooling step 260, and the residence time and the temperature in the reaction step 250 are sufficient to substantially reduce the content of the ester 3' in the aqueous solution 6'. As a result, a faster dissolution and hydrolysis of the ester 3' will occur. Therefore the problems of precipitation and/or viscosity increases in the circulation are surprisingly avoided without the need for adding additional liquids such as water and/or lactic acid and/or caustic solution to the circulation.

In specific embodiments of the invention, the process in the circulation 73 may comprise more than one heating step 240, more than one reaction step 250, or more than one cooling step 260, and combinations thereof.

Figure 6:
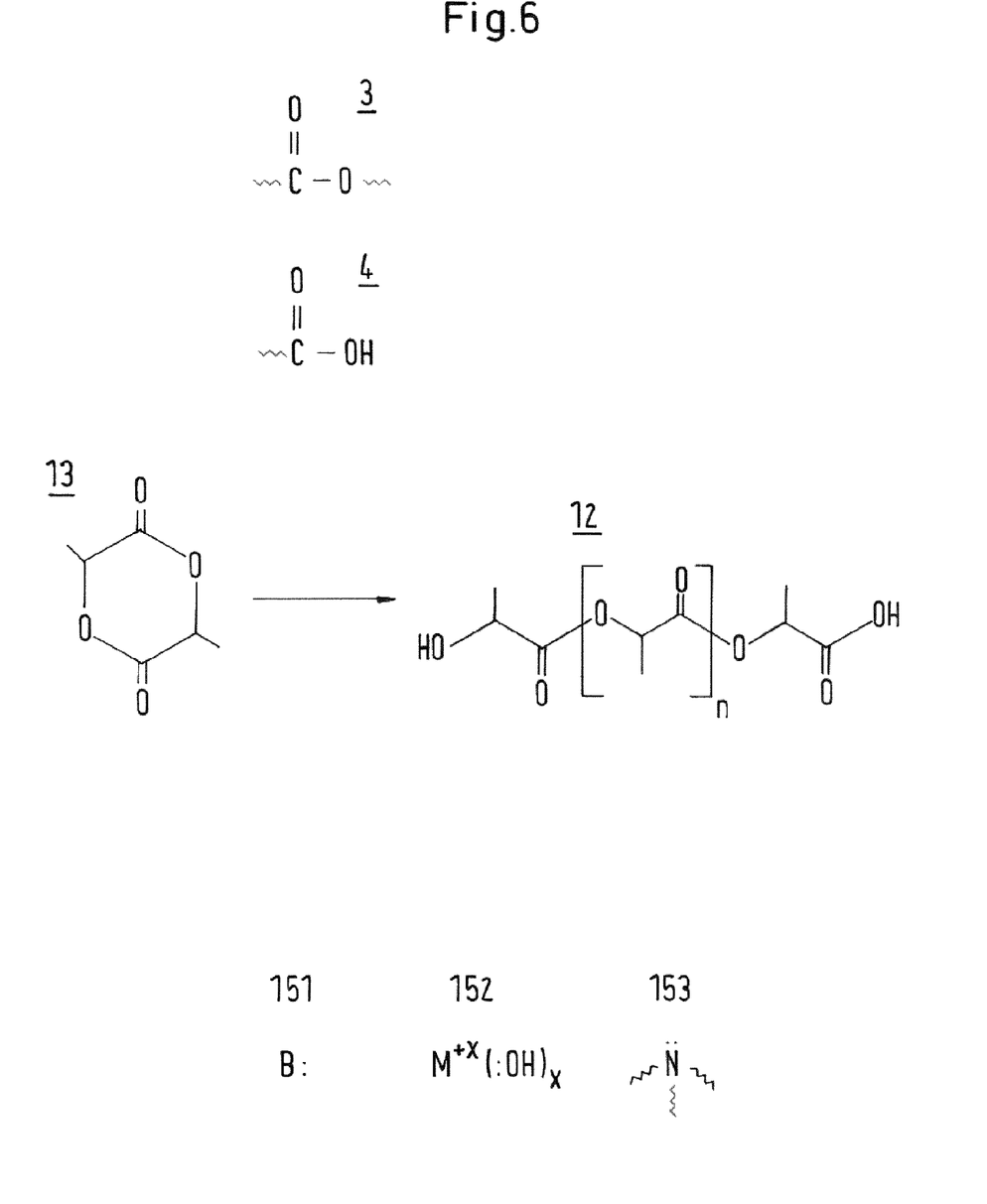
FIG. 6 shows a schematic view of embodiments of an ester, an acid, a lactide, a polylactic acid polymer, and specific embodiments of catalysts for use in the method and apparatus of the invention.

In a preferred embodiment of the method 205, the ester 3' is a cyclic diester of an alpha-hydroxycarboxylic acid of the formula I, formula I wherein R is selected from the group consisting of hydrogen or linear or branched aliphatic radicals having 1 to 6 carbon atoms, and wherein the acid is an alpha-hydroxycarboxylic acid of the formula II corresponding to the diester of the formula I, formula II These esters of formula I strongly benefit from the invention due to their low solubility in aqueous solutions and their associated problems with precipitation and blockage in the condensation and/or washing of their vapors.

In specific preferred embodiments, the ester 3' of formula I is selected from the group consisting of (S,S)-Lactide (CAS No. 4511-42-6); (R,R)-Lactide (CAS No. 25038-75-9); [(R,S)-Lactide, also known as meso-Lactide (CAS No. 13076-19-2); and mixtures thereof (CAS No. 26680-10-4). The acid 4' is then selected from the group consisting of L-(+)-lactic acid, also known as (S)-lactic acid (CAS No. 50-21-5 and 79-33-4); D-(−)-lactic acid, also known as (R)-lactic acid (CAS No. 10326-41-7); and mixtures thereof.

According to another preferred embodiment, the vapor mixture 5' in the method 205 is obtained from the devolatization of a polylactic acid (PLA) polymer 12' prepared by a ring opening polymerization of a lactide 13'. PLA 12' is known in various homopolymer forms (CAS No. 26100-51-6; Racemic polylactic acid (D, L-PLA) dl-polylactide: CAS No.: 51063-13-9, 26680-10-4, 26100-51-6, and 34346-01-5; and Poly-L-lactic acid l-polylactide (L-PLA) CAS No.: 26261-42-2 and 33135-50-1) and copolymer forms as random, branched, block, graft, and star copolymers with non-lactide comonomers including glycolic acid, glycolide, polyethelene glycol, poly(oxyethelene glycol), poly(propylene oxide), butyroloactone, valerolactone, caprolactone, 1,5-dioxepan-2-one, trimethylene carbonate, and N-isopropylamide. Methods to devolatilize PLA and obtain vapor mixtures 5' containing a lactide 13' are known, for example, from EP2030667, EP2310437, and EP 2271696.

According to another preferred embodiment of the method 205, the content of the ester 3' of in the aqueous solution 6' is reduced in the reaction step 250 to less than 10 wt %, preferably less than 5, more preferably less than 3 so as to avoid problems with precipitation, blockage and viscosity increases.

The content of the ester 3' in the aqueous solution 6' may be measured by a variety of analytical methods. Chromatographic methods include gas chromatography coupled with detection methods such TCD, FID, ECD, or MS, high-performance liquid chromatography coupled with UV/VIS, fluorescence, refractive index or MS detectors and ionic chromatography. Spectroscopic methods include Raman, NIR, FTIR-ATR, UV/Vis and NMR spectroscopies. Said methods are known, for example, from Principles of Instrumental Analysis (ISBN 978-0495012016) or Analytical Measurements and Instrumentation for Process and Pollution Control (ISBN 978-0250404056). These methods may be carried out either using on-line methods or by analyzing samples off-line. On-line analytical methods are known, for example, from Instrument technology: On-line analysis instruments, Vol. 2 (ISBN 0-408-00198-4).

The content of ester referred to in this application is defined as the content as determined by the gas chromatographic method.

In another preferred embodiment, the content of the ester is reduced in the reaction step 250 to a level such that the solution after the reaction contains no ester in the form of a precipitate and/or a suspended solid as determined by visual observation.

Figure 4:
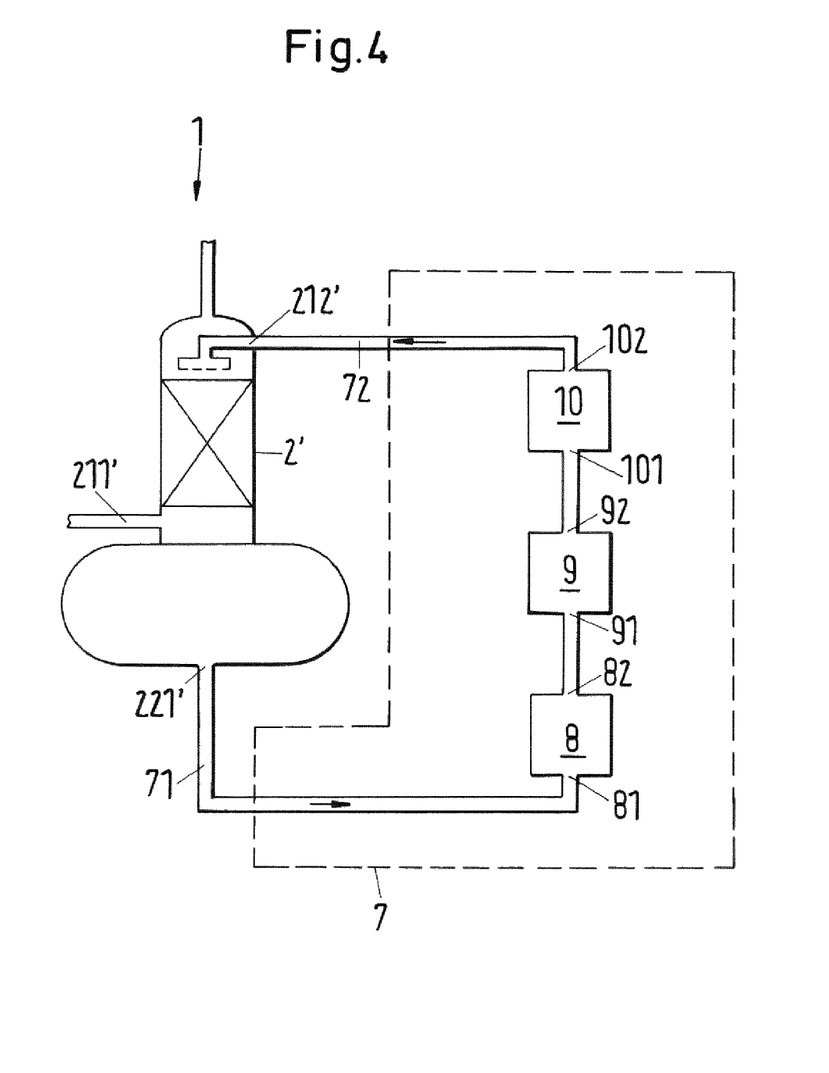
FIG. 4 shows a schematic view of an embodiment of an apparatus according to the invention and suitable for use with the method shown in FIG. 3.

It will be understood that the residence time and temperature may each vary over a very large range in order to substantially reduce the content of the ester 3' in the aqueous solution 6'. The temperature in the reaction step 250 is defined as the average temperature in the reaction step 250, for example, the average temperature in a reactor 9. In the case of a tubular reactor, the average temperature is defined here as the average of the temperature at the inlet 91 and at the outlet 92. In a preferred embodiment of the method 205, the residence time in the reaction step 250 is at least 0.1 min, preferably 1, more preferably 5, most preferably 10, and the temperature in the reaction step 250 is at least 10° C., preferably 20, more preferably 40, most preferably 60. It will be understood by one skilled in that art that these residence times and temperatures may be combined without limitation. In still yet another preferred embodiment of the method 205, the residence time in the reaction step 250 is from 0.10 to 30 min and the temperature in the reaction step 250 is from 10 to 95° C., preferably the time from 0.5 to 25 and the temperature from 20 to 90, more preferably the time from 0.75 to 20 and the temperature from 40 to 80, most preferably the time from 1 to 15 and the temperature from 50 to 75. It will be understood by one skilled in that art that these ranges of residence times and temperatures may be combined without limitation. The use of such temperatures and residence times is beneficial in ensuring that the content of the ester 3' in the aqueous solution 6' is sufficiently reduced so that the problems of precipitation, blockage, and increased viscosity do not occur in the circulation. These preferred embodiments for temperatures and residence times and their ranges have been determined by carrying out measurements of the required time to dissolve and/or hydrolyze lactide 13' in water or aqueous solutions 6' of lactic acid to an undetectable level according to visual observation of precipitates and/or suspended solids as a function of temperature and lactide concentration, as described later in the Examples.

It will be understood by one skilled in the art that the residence time will depend somewhat on the choice of the reactor 9 used for the reaction step 250. It will be understood by one skilled in the art that a reactor 9 will be chosen capable of having a residence appropriate for the reaction step 250 according to the present invention, for example, capable of providing the residence times disclosed in the present application. It will further be understood by one skilled in the art that the residence time may be varied to some extent during the process, for example, the rate of flow through the reactor 9 may reduced in order to provide a longer residence time in order to reduce the content of the ester 3', if desired. For example, if the flow rate is observed to decrease and/or the pressure to increase and/or precipitates and/or blockage are observed, the residence time may be increased in the reaction step 250 in order to reduce the content of the ester 3'. Although they may often be more expensive, the use of tubular reactors allow for quite short residence times. In one embodiment, a tubular reactor is used as a reactor 9 and the residence time in the reaction step 250 is from 0.1 to 5 min, preferably 0.15 to 2, more preferably 0.2 to 1.

It will be understood by one skilled in the art that for a given apparatus that it will generally be more convenient to vary the temperature rather than the residence time in the reaction step 250, particularly when larger scale variations are desired or required.

In a further preferred embodiment of the method 205, the reaction step 250 takes place in the presence of an added catalyst 15 to increase the rate of hydrolysis and/or derivitization reactions and thus also the rate of reduction of the content of the ester 3' in the aqueous solution 6'. Appropriate catalysts 15 for use in the invention include bases 151. Inorganic metal hydroxides 152 of general formula $M^{+x}(OH)_x$ such as sodium, potassium or calcium hydroxides may be used, as well as organic bases 153 such as amine, alkylammonium hydroxide, and imidazole compounds.

The place of addition of the catalyst 15 in the method of the invention 205 or in the apparatus 1 of the invention is not specifically limited. In one embodiment, catalyst 15 is added prior to, during or after the contact of the vapor mixture 5' with the aqueous solution 6' in the method 205, or in the column 2' of the apparatus 1. In another embodiment, the catalyst 15 is added in a circulation 73 before and/or during a reaction step 250 in the method 205, or in the circuit 7 before or in a reactor 9 in the apparatus 1.

The amount of added catalyst 15 to the aqueous solution 6' is also not specifically limited, and the catalyst 15 may be added in certain embodiments in amounts of from 10 ppm to 5 wt %, specifically from 20 ppm to 1 wt %, more specifically from 50 ppm to 5,000 ppm. In the case of added base catalyst 151, the amount added in certain embodiments will be enough to maintain the pH of the aqueous solution above 7, preferably above 8, more preferably above 9, and most preferably above 10.

It will be understood by one skilled in the art that the use of an added catalyst 15 allows shorter residence times and/or lower temperatures to be used in the reaction step 250. In specific embodiments, a catalyst 15 is used and the residence time in the reaction step 250 is from 0.1 to 10 min, preferably 0.2 to 5, more preferably 0.25 to 3. In other specific embodiments, the temperature in the reaction step 250 is from 10 to 80° C., preferably 15 to 70, more preferably 20 to 60. These residence times and temperatures and their ranges may be combined without limitation.

FIG. 4 shows a specific embodiment of an apparatus, which as a whole is labeled with reference number 1. Similar to the apparatus of the prior art 1', the apparatus 1 of the invention comprises a countercurrent column 2' for contacting a vapor mixture 5' with an aqueous solution 6' having a first inlet 211' for the vapor mixture 5', a second inlet 212' for the aqueous solution 6', and an outlet 221' for the aqueous solution 6'. The apparatus 1' additionally comprises a circuit 7 in fluid communication with the column 2' and for circulating the aqueous solution 6' and having an inlet 71' and an outlet 72' for the aqueous solution 6', wherein the inlet 71' is in fluid communication with the outlet 221' and the outlet 72' is in fluid communication with the second inlet 212'. In contrast to the prior art, the circuit 7 of the invention comprises a first heat exchanger 8 for carrying out a heating step having an inlet 81 and an outlet 82, a reactor 9 for a reaction step 250 having an inlet 91 and an outlet 92, and a second heat exchanger 10 for carrying out a cooling step having an inlet 101 and an outlet 102, wherein the inlet 81 is in fluid communication with the inlet 71', the outlet 82 is in fluid communication with the inlet 91, the outlet 92 is in fluid communication with the inlet 101, and the outlet 102 is in fluid communication with the outlet 72'. As a result of this circuit 7, a faster dissolution and/or hydrolysis of the ester 3' will occur. Therefore the problems of precipitation and/or viscosity increases are surprisingly avoided without the need for adding additional liquids such as water and/or lactic acid or caustic solutions to the circulation and without the need to increase the temperature and thus vapor pressure in the countercurrent column 2'.

It will be understood by one skilled in the art that the column 2' and its first inlet 211', second inlet 212' and outlet 221' are not specifically limited so long as they allow for a contact of the vapor mixture 5' with the aqueous solution 6'. In certain embodiments, the apparatus 1 has more than one column 2'.

Conventional countercurrent columns 2' may be used including a non-packed or a packed column, as well as a spray column. In one embodiment, the countercurrent column is a condensation and washing device as described in US2010/0252076 A1, which is hereby incorporated by reference. A packed column is generally preferred in order to improve the efficiency of the contact of the vapor mixture 5' with the aqueous solution 6'. In one embodiment, the column 2' contains a mass transfer element known in the art, such as e.g. trays, Raschig and/or Pall rings, saddles, such as e.g. Berl saddle, spheres, hooks, NOR-PAC, BIO-NET, Hel-X, Top-Packs, Mellapak, Montz-Pak, Ralu-Pak, Raschig Super-Pak and/or packings made of fabric. In a specific embodiment, the surface of the mass transfer element used is between 20 $m^2/m^3$ and 500 $m^2/m^3$.

In an embodiment, the column 2' has a column sump arranged so that the lower part of the column 2' opens into the column sump. The aqueous solution 6' then collects in the sump after its contact with the vapor mixture 5' and until it is discharged by means of the outlet 22'. In an alternative embodiment, the aqueous solution 6' is collected after contact instead in a separate tank.

Typically the first inlet 211' and outlet 22' are arranged in the lower part of the column 2', preferably below any mass transfer element, and the inlet 212' is arranged in the upper part of the column 2', preferably above any mass transfer element. In a preferred embodiment the inlet 211' is arranged below the mass transfer element and above a sump, the outlet 22' is arranged in the sump, and the inlet 212' is arranged above the mass transfer element. The aqueous solution 6' then falls by gravity through the column 2' where it is collected in the sump and discharged to the circuit 7. In an alternative embodiment, the inlet 212' is located on the side of the column 2' in the case of a spray column.

Figure 5:
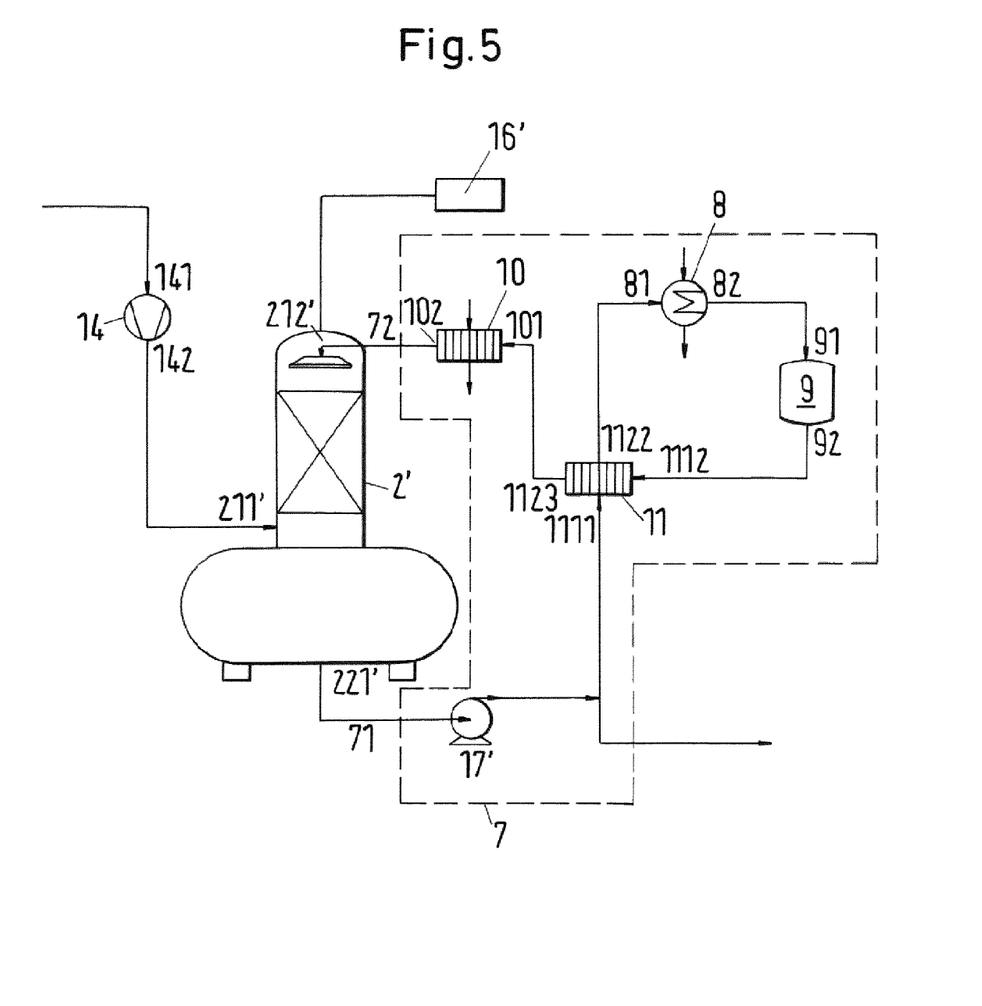
FIG. 5 shows a schematic view of a preferred embodiment of an apparatus according to the invention.

According to another preferred embodiment of the method 205, the vapor mixture 5' in the method 205 is passed through a steam ejector 14 prior to contacting the aqueous solution 6'. Likewise a preferred embodiment of the apparatus 1 additionally comprises a steam ejector 14 for passing the vapor mixture 5' through prior to contacting the aqueous solution 6', wherein the ejector has an inlet 141 and an outlet 142, and the outlet 142 is in fluid communication with the first inlet 211'. In other preferred embodiments, the vapor mixture 5' is passed through two or more steam ejectors 14 in series and the apparatus comprises two or more steam ejectors 14. The use of multiple steam ejectors 14 allows for a greater pressure difference between the process of contacting the vapor mixture 5' and the aqueous solution 6' and the process for devolatilization of the ester 3'. Therefore the devolatilization may optimally occur at high vacuums whereas the contacting of the vapor mixture 5' and the aqueous solution 6' may conveniently occur at lower vacuum levels without the equipment requirements and energy costs of maintaining a high vacuum in the contacting step.

In a preferred embodiment, the first inlet 211' is in fluid communication with a devolatilization vessel, for example, a flash evaporator, falling strand devolatizer, thin film evaporator, high volume melt kneader, or vented single-screw or twin-screw extruders used for the devolatilization of a polylactide polymer 12'.

In a preferred embodiment, the second inlet 212' has at least one liquid distributor for distributing the aqueous solution which is supplied via outlet 72', said distributor being disposed above any mass transfer element. The liquid distributor is preferably a trickling or a spraying device, a spray condenser or a sprinkler.

In one embodiment, the column 2' is connected to a vacuum system 16' arranged above the inlet 212', preferably above any mass transfer element and any liquid distributor. The vacuum system 16' serves the purpose of discharging any non-condensable gasses and vapors. The vacuum system 16' may comprise one or more conventional vacuum pumps such as a steam ejector, a liquid ring pump, a root blower, or a screw pump. Optionally there will be one or more cooling traps in line between the column 2' and the vacuum system 16' and in fluid communication with them.

The first heat exchanger 8 and second heat exchanger 10 of the circuit 7 are not specifically limited, and they may each be in the form of a plate, monotube, spiral, or Sulzer Mixer Reactor (SMR™) heat exchangers. The heat exchangers may be of the single pass or multipass type. Plate heat exchangers are preferred because they are economical for use with low viscous fluids such as is typical for the aqueous solution 6' in the present invention. In some embodiments, more than one heat exchanger 8 and 10 may be used.

The reactor 9 is also not specifically limited and may be any reactor suitable for carrying out a reaction step 250 with a residence time and temperature. For example, the reactor may be in the form of one or more stirred vessel, montube, multitube or Sulzer Mixer Reactor (SMR™) reactors. In one embodiment, two batch reactors 9 are operated in tandem.

According to another preferred embodiment of the method 205, a portion of the heating step 240 and/or a portion of the cooling step 260 take place in a recuperator 11 in order to reduce the energy consumption. In one embodiment, the entire heating step 240 and/or the entire cooling step 260 take place in a recuperator 11. Likewise a preferred embodiment of the apparatus 1 additionally comprises a recuperator 11 for carrying out a further heating step 240" and a further cooling step 260" in the circuit 7. In one specific preferred embodiment of the apparatus 1 the first heat exchanger 8 and/or second heat exchanger 10 are part of a recuperator 11. In other embodiments of the method 205 and the apparatus 1, more than one recuperator 11 may be used. It will be understood by one skilled in the art that the recuperator(s) 11 may be arranged before and/or after each of the first heat exchanger 8 and the second heat exchanger 10 in the circuit 7 without limitation so long as a portion of the heating 240 and a portion of the cooling 260 in the circuit 7 takes place in the recuperator(s) 11. The recuperators 11 are not specifically limited and, for example, may be of the plate, monotube or mutlitube types.

In a preferred embodiment of the method 205, the contacting of the vapor mixture 5' with the aqueous solution 6' takes place under at least a partial vacuum, preferably a vacuum of less that 100 mbar, more preferably less than 50 mbar, and most preferably less than 30 mbar. Likewise another preferred embodiment of the apparatus 1 additionally comprises a vacuum system 16 in fluid communication with the countercurrent column 2'. A vacuum is beneficially in readily maintaining a high vacuum also in the devolatilization vessel to favor distillation of lactide 13' there.

The circuit 7 is not specifically limited and may additionally comprise one or more pumps, valves, additional outlets and additional inlets. A pump 17' may be used to provide a driving force for the circulation 73 of the aqueous solution 6' through the circuit 7. Additional outlets may be used to remove liquid or waste or samples for analysis from the circuit 7, and additional inlets may be used to add water, acid 4', preferably lactic acid, and/or catalyst 15 to the circuit 7, if desired. In a preferred embodiment, the circuit 7 comprises an inlet for the addition of the catalyst 15, preferably before and/or in the reactor 9.

The circuit 7 may also comprise various on-line analytical equipment such as spectrometers or their sensors for measuring the content of the ester 3' and sensors such as pH sensors and/or pressure sensors and/or flow meters to aid in the proper operation of the circuit 7. For example, if the content of the ester 3' in the aqueous solution 6' increases, or if the pressure increases or the flow decreases in the circuit 7 indicating precipitation and blockage, then the temperature in the reactor 9 may be increased in order to increase the rate of reduction of the content of the ester 3'.

FIG. 5 shows an exemplary schematic view of a preferred embodiment of an apparatus 1 according to the invention having a steam ejector 14, a recuperator 11, a vacuum system 16', and a pump 17'.

Another aspect of the invention concerns the use of the apparatus 1 in the method 205, preferably in the production of a lactide 13' or a polylactic acid polymer 12'. In one embodiment, the apparatus 1 is part of a polymerization plant for the production of a polyester polymer. Such use benefits then from the previously discussed advantages of the apparatus and the method of the invention. In a preferred embodiment, the use of the method 205 is in the production of a polylactic acid polymer 12'.

EXAMPLES

The following examples are set forth to provide those of ordinary skill in the art with a detailed description of how the methods claimed herein are evaluated, and are not intended to limit the scope of what the inventors regard as their invention. Unless otherwise indicated, the temperature is in degrees Celsius (° C.), and the time is in min.

Solid lactide 13' was contacted with water or various aqueous solutions of lactic acid and various mixtures having different proportions of lactide 13' and water or aqueous solutions of lactic acid were made. The time to dissolve and/or hydrolyze all of the solid content present as precipitate or suspended solid to give transparent solutions was determined for various temperatures.

Figure 7:
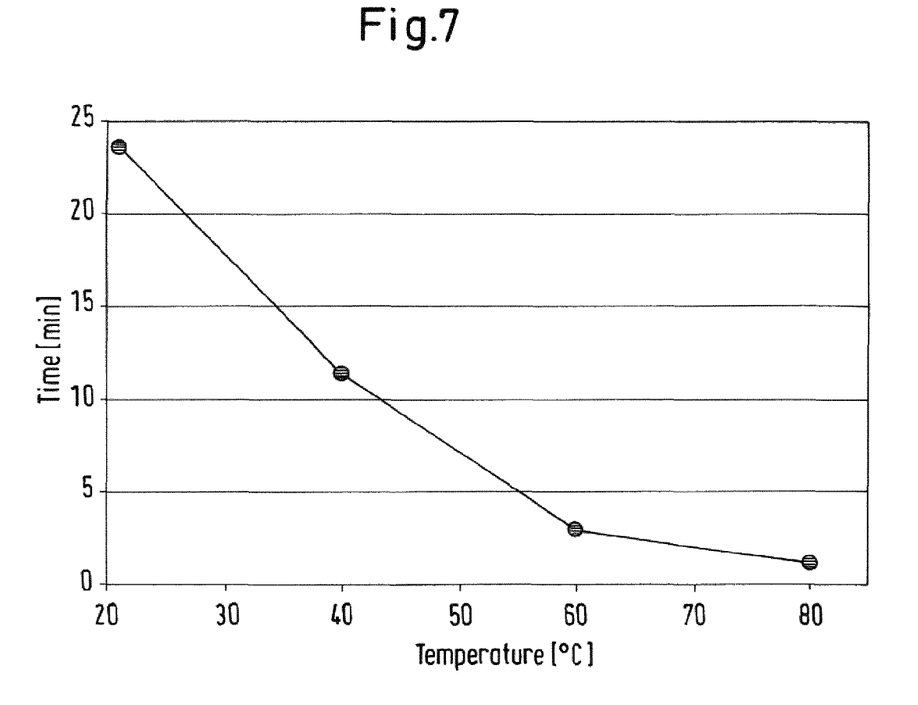
FIG. 7 shows data for the residence time (min) to reduce the content of a lactide as precipitate or dissolved solid in aqueous solution to a non-detectable level (visual observation) as a function of temperature (° C.).

Representative data is shown in FIG. 7 for the dissolution and/or hydrolysis of solid lactide in water at various temperatures. It was observed that increasing the residence time at a particular temperature led to a reduction and finally elimination of the solids content. It may be seen that increasing the temperature reduces the time required to eliminate the solids content of the mixture of lactide and water.

It was further observed that the presence and/or addition of lactic acid led to a reduction in the time necessary to eliminate the solids content. Without wishing to be bound by any specific mechanism, it is believed that the hydrolysis of lactide 3' to lactoyllactic acid and/or lactic acid is beneficial in autocatalytically reducing the solids and lactide content. Therefore the presence of the acid 4' in the reaction step 250 of the circulation 73 and/or in the reactor 9 of the circuit 7 is beneficial in reducing the content of the ester 3'.

The invention claimed is:

1. A method for the removal of an ester from a vapor mixture containing the ester, by bringing the vapor mixture into contact with an aqueous solution containing the acid corresponding to the ester, wherein a portion of the ester is dissolved in or otherwise transferred to the aqueous solution, and the aqueous solution is after the contact led in a circulation, wherein the aqueous solution is processed in the circulation in a process comprising:
a heating step,
a reaction step having a residence time and a temperature, and
a cooling step,
wherein the heating step precedes the reaction step, the reaction step precedes the cooling step, and the residence time and the temperature in the reaction step are sufficient to substantially reduce the content of the ester in the aqueous solution through a dissolution and/or hydrolysis of the ester.

2. The method according to claim 1, wherein the ester is a cyclic diester of an alpha-hydroxycarboxylic acid of the formula I, formula I wherein R is selected from the group consisting of hydrogen or linear or branched aliphatic radicals having 1 to 6 carbon atoms, and wherein the acid is an alpha-hydroxycarboxylic acid of the formula II corresponding to the diester of the formula I, formula II 3. The method according to claim 1, wherein the vapor mixture is obtained from the devolatization of a polylactic acid polymer prepared by a ring opening polymerization of a lactide.

4. The method according to claim 1, wherein the vapor mixture is passed through a steam ejector prior to contacting the aqueous solution.

5. The method according to claim 1, wherein a portion of the heating step and a portion of the cooling step take place in a recuperator.

6. The method according to claim 1, wherein the content of the ester in the aqueous solution is reduced in the reaction step to less than 10 wt %.

7. The method according to claim 1, wherein the residence time in the reaction step is at least 0.1 min, and the temperature in the reaction step is at least 10° C.

8. The method according to claim 1, wherein the residence time in the reaction step is from 0.10 to 30 min and the temperature in the reaction step is from 10 to 95° C.

9. The method according to claim 8, wherein the residence time in the reaction step is from 0.5 to 25 min and the temperature in the reaction step is from 20 to 90° C.

10. The method according to claim 8, wherein the residence time in the reaction step is from 0.75 to 20 min and the temperature in the reaction step is from 40 to 80° C.

11. The method according to claim 8, wherein the residence time in the reaction step is from 1 to 15 min and the temperature in the reaction step is from 50 to 75° C.

12. The method according to claim 1, wherein the reaction step takes place in the presence of an added catalyst.

13. The method according to claim 1, wherein the contacting of the vapor mixture with the aqueous solution takes place under at least a partial vacuum.

14. The method according to claim 13, wherein the contacting of the vapor mixture with the aqueous solution takes place at a vacuum of less than 100 mbar.

15. An apparatus for carrying out a method for the removal of an ester from a vapor mixture containing the ester, by bringing the vapor mixture into contact with an aqueous solution containing the acid corresponding to the ester, wherein a portion of the ester is dissolved in or otherwise transferred to the aqueous solution, and the aqueous solution is after the contact led in a circulation, the apparatus comprising:
a countercurrent column for contacting the vapor mixture with the aqueous solution,
a circuit in fluid communication with the countercurrent column and for circulating the aqueous solution,
wherein the countercurrent column has a first inlet for the vapor mixture and a second inlet for the aqueous solution and an outlet for the aqueous solution, wherein the circuit has an inlet and an outlet for the aqueous solution, and wherein the inlet is in fluid communication with the outlet, and wherein the outlet is in fluid communication with the second inlet, wherein the circuit comprises:
a first heat exchanger for carrying out a heating step having an inlet and an outlet,
a reactor for a reaction step to reduce the content of the ester in the aqueous solution by a dissolution and/or hydrolysis of the ester, the reactor having an inlet and an outlet, with the reaction step having a residence time and being carried out at a temperature,
a second heat exchanger for carrying out a cooling step having an inlet and an outlet,
wherein the heating step precedes the reaction step, the reaction step precedes the cooling step, and the residence time and the temperature in the reaction step are sufficient to substantially reduce the content of the ester in the aqueous solution,
wherein the inlet of the first heat exchanger is in fluid communication with the inlet of the circuit, the outlet of the first heat exchanger is in fluid communication with the inlet of the reactor, the outlet of the reactor is in fluid communication with the inlet of the second heat exchanger, and the outlet of the second heat exchanger is in fluid communication with the outlet of the circuit, and
wherein the aqueous solution containing the ester is present in the circuit, and wherein the content of ester in the aqueous solution in the circuit before the reactor is greater than the content of ester in the aqueous solution in the circuit after the reactor.

16. The apparatus according to claim 15, further comprising a recuperator for carrying out a further heating step and a further cooling step in the circuit.

17. The apparatus according to claim 15, further comprising a steam ejector for passing the vapor mixture through prior to contacting the aqueous solution, wherein the ejector has an inlet and an outlet, and the outlet of the ejector is in fluid communication with the first inlet of the countercurrent column.

18. The apparatus according to claim 15, further comprising a vacuum system in fluid communication with the countercurrent column.

19. The method of claim 1, wherein the method is carried out in an apparatus comprising:
- a countercurrent column for contacting the vapor mixture with the aqueous solution,
- a circuit in fluid communication with the countercurrent column and for circulating the aqueous solution, wherein the countercurrent column has a first inlet for the vapor mixture and a second inlet for the aqueous solution and an outlet for the aqueous solution, wherein the circuit has an inlet and an outlet for the aqueous solution, and wherein the inlet is in fluid communication with the outlet, and wherein the outlet is in fluid communication with the second inlet, wherein the circuit comprises:
- a first heat exchanger for carrying out a heating step having an inlet and an outlet,
- a reactor for a reaction step to reduce the content of the ester in the aqueous solution by a dissolution and/or hydrolysis of the ester, the reactor having an inlet and an outlet, with the reaction step having a residence time and being carried out at a temperature,
- a second heat exchanger for carrying out a cooling step having an inlet and an outlet, wherein the heating step precedes the reaction step, the reaction step precedes the cooling step, and the residence time and the temperature in the reaction step are sufficient to substantially reduce the content of the ester in the aqueous solution through a dissolution and/or hydrolysis of the ester, wherein the inlet of the first heat exchanger is in fluid communication with the inlet of the circuit, the outlet of the first heat exchanger is in fluid communication with the inlet of the reactor, the outlet of the reactor is in fluid communication with the inlet of the second heat exchanger, and the outlet of the second heat exchanger is in fluid communication with the outlet of the circuit, and wherein the aqueous solution containing the ester is present in the circuit, and wherein the content of ester in the aqueous solution in the circuit before the reactor is greater than the content of ester in the aqueous solution in the circuit after the reactor.

20. The method of claim 1, wherein the method is performed in the production of a lactide or a polylactic acid polymer.

* * * * *